United States Patent [19]

Takenawa et al.

[11] Patent Number: 4,988,519
[45] Date of Patent: Jan. 29, 1991

[54] COAGULANT FOR A NOVEL YOGHURT-LIKE FOOD

[75] Inventors: Seishi Takenawa, Nara; Mikio Ueda, Ashiya; Hideki Takeda, Tenri, all of Japan

[73] Assignee: Fujisawa Pharmaceutical Co., Ltd., Osaka, Japan

[21] Appl. No.: 339,588

[22] Filed: Apr. 13, 1989

Related U.S. Application Data

[62] Division of Ser. No. 36,455, Apr. 9, 1987, Pat. No. 4,842,873.

[30] Foreign Application Priority Data

Apr. 28, 1986 [JP] Japan .................................. 61-100142

[51] Int. Cl.$^5$ ............................ A23L 1/20; A23L 1/05
[52] U.S. Cl. ........................................ 426/63; 426/46; 426/52; 426/573; 426/634; 426/583

[58] Field of Search .................. 426/46, 63, 49, 51, 426/52, 61, 634, 583, 573

[56] References Cited

U.S. PATENT DOCUMENTS 3,857,970 12/1974 Tsumura et al. ...................... 426/46
3,982,025 9/1976 Hashimoto et al. ................... 426/46

Primary Examiner—Marianne Cintins
Attorney, Agent, or Firm—Oblon, Spivak, McClelland, Maier & Neustadt

[57] ABSTRACT

A coagulent for preparation of an unfermented yoghurt-like food is disclosed. The coagulent consists essentially of an admixture of protease and a coagulent for tofu selected from glucono delta lactone, calcium sulfate, calcium chloride, calcium gluconate, calcium lactate, magnesium sulfate, magnesium chloride, calcium pantothenate and calcium glycerophosphate.

6 Claims, No Drawings

COAGULANT FOR A NOVEL YOGHURT-LIKE FOOD

This is a division of application Ser. No. 07/036,455, filed on Apr. 9, 1987, now U.S. Pat. No. 4,842,873.

The present invention relates to a novel coagulant for yoghurt-like food and a novel yoghurt-like food manufactured with use of said coagulant. More particularly, the invention relates to a coagulant for a novel yoghurt-like food containing protease and a coagulant for tofu as main ingredients and to a novel yoghurt-like food manufactured by adding said coagulant to soya milk to cause coagulation thereof.

There is known a method of manufacturing a yoghurt-like food from a soya milk based on vegetable protein (For example, Japanese Kokai Tokkyo Koho No. 53-56361 and No. 58-23747).

The conventional yoghurt-like foods starting from soybean are invariably produced by lactic acid fermentation of soya milk and the manufacturing process involved is comparatively complicated and requires strict production control.

The present inventors discovered that when protease and a coagulant for tofu (soybean curds) are added to soya milk for coagulation, a yoghurt-like food is easily obtained. This finding was followed by further investigations which have resulted in the present invention.

The yoghurt-like food that can be obtained by means of protease and a coagulant for tofu according to the present invention is a novel yoghurt-like food which is quite different from the conventional yoghurt-like foods manufactured by lactic acid fermentation of soya milk.

The protease to be used in the coagulant for the yoghurt-like food according to the present invention may be any enzyme capable of decomposing soybean protein and, for example, bromelain, papain, ficin, trypsin, pepsin, and chymotrypsin may be mentioned. Among these protease, bromelain, papain and ficin are more preferable. These enzymes may be used either singly or as a mixture of two or more kinds.

The coagulant for tofu in the yoghurt-like food coagulant according to the present invention may be any coagulant for tofu used in the manufacture of tofu, for example, glucono delta lactone, calcium sulfate, calcium chloride, calcium gluconate, calcium lactate, magnesium sulfate, magnesium chloride, calcium pantothenate, calcium glycerophosphate and the like. Among these coagulants, glucono delta lactone is the most preferable coagulant.

These coagulants for tofu may be used singly or in combination with two or more coagulants, and with acids such as lactic acid, citric acid, malic acid, tartaric acid, ascorbic acid, phosphoric acid, fumaric acid, etc. and these acids serve as taste-ameliorating agents.

In addition, various other substances can be incorporated for improving the taste, flavor, appearance, water holding capacity, dimensional stability, texture and other qualities of yoghurt-like foods according to the present invention or for nutritional enrichment.

As examples of such taste-ameliorating agents, there may be mentioned sucrose, fructose, high fructose corn sirup, aspartame and other sweeteners, various salts with organic acids such as sodium citrate, sodium lactate, sodium malate, sodium tartarate, and the like, sodium carbonate, sodium chloride, various phosphates (e.g., sodium tripolyphosphate) and so on. Among these agents, sodium citrate, sodium lactate, sodium malate, sodium tartarate, sodium carbonate, various phosphates, etc. serve as coagulation retarders, too.

As agents for improvement of texture, water holding capacity, dimensional stability, etc., there may be mentioned agar, carrageenin, sodium alginate, pectin, gelatin, and so on.

By varying the levels of addition of such texture, water holding capacity, dimensional stability and other quality ameliorating agents, yoghurt-like foods having various textures can be manufactured. In addition, various flavors (e.g., chocolate, banana, spinach, strawberry, green tea, pumpkin, plain yoghurt-like flavor, etc.), colors (e.g., cochineal, beet red, crocin, etc.), tocopherol and other vitamins, minerals and other nutritional enriching substances may be added in appropriate proportions.

The relative amount of protease and a coagulant for tofu in the yoghurt-like food according to the present invention varies with the kinds of the coagulant to be used. In case of glucono delta lactone, it is generally sufficient to use 0.01 to 50 weight parts of protease (assuming that its activity is 20 units/mg, as determined by the assay method described hereinafter; the same applies hereinafter) to each 100 weight parts of glucono delta lactone. Similarly, in case of calcium salts, 0.05 to 90 weight parts of protease and in case of magnesium salts, 0.1 to 150 weight parts of protease to each 100 weight parts of calcium or magnesium. A yoghurt-like food coagulant having such a composition is added to soya milk, for example at the level of 50 to 10,000 units as protease to each liter of soya milk with a solids content of 10 percent.

The yoghurt-like food according to the present invention can be prepared by adding protease and a coagulant for tofu to soya milk so as to cause coagulation of the soya milk. In this process, protease and a coagulant for tofu may be independently added to soya milk and the above-mentioned various additives may be further added. It is also possible to prepare a yoghurt-like food coagulant composition containing protease and a coagulant for tofu as main ingredients beforehand and add it to soya milk.

As the soya milk mentioned above, any known soya milk can be used as it is. Thus, extracts or solutions of soya bean, soya powder, soya protein, etc. which are used for the production of soybean curds, fried soybean curds, etc., or aqueous suspensions of the commercial soya milk drink or soya milk powder can be employed.

The concentration of soya milk is at least 4 percent (weight %; the same applies hereinafter) on the basis of the solids contained and preferably in the range of about 9 to 12% on the same basis.

The level of addition of a coagulant for tofu to soya milk varies with the kind of the coagulant to be used. The level of addition of glucono delta lactone to soya milk, when no other soybean curd coagulant is concomitantly used, is at least 0.1 to 10 percent relative to soya milk (irrespective of the solids content of soya milk) and the use of glucono delta lactone in the range of 1 to 5 percent imparts a satisfactory acid taste to yoghurt-like foods. When glucono delta lactone is used in combination with other coagulant for tofu, for example magnesium sulfate, one may mix glucono delta lactone with magnesium sulfate in a ratio of 2 to 1 and add the mixture to soya milk at the level of 0.1% or more. The level of addition of the coagulants other than glucono delta lactone is, as concentration of calcium or magnesium, 7 to 150 mM per soya milk with 10% solids, and more preferably 10 mM or more.

The level of addition of protease to soya milk depends on the kind of protease used. Generally, it is used in an amount of 50 units or more (preferably 50 to 10,000 units) per liter of soya milk with 10% solids. Taking bromelain as an example, 50 units or more and preferably 400 units or more are suitable. In the case of papain, 50 units or more and preferably 2000 units or more are appropriate. Ficin may be used in an amount of 50 units or more, preferably 300 units or more.

The coagulation reaction proceeds at any temperature above the freezing temperature of soya milk. Generally, the reaction is preferably conducted under heating at 50° to 90° C. for about 30 minutes to about 1 hour. In the manner described above, a yoghurt-like food according to the present invention can be manufactured.

Determination of Protease Activity

Reagents

Substrate solution: In 250 ml of 30 mM phosphate buffer (pH 7.5) is dissolved 3 g of Hammarsten's casein under heating and, after cooling, L-cysteine is added at the level of 6 mM.

Trichloroacetic acid (TCA) solution: In water are dissolved 9 g of trichloroacetic acid and 15 g of sodium acetate, followed by addition of 19.5 ml of glacial acetic acid. The solution is filled up with water to 500 ml.

Enzyme solution: The enzyme of interest is dissolved in water.

Method

To 5.0 ml of the substrate solution is added 50 μl of the enzyme solution and after 10 minutes (reaction temperature 35° C.) the reaction is stopped by addition of 5.0 ml of the TCA solution. The resulting solution is centrifuged and the absorbance of the supernatant is measured (wavelength 275 nm; quartz cell length 1 cm). To generate data at 0 minute, 5.0 ml of the TCA solution is added to 5.0 ml of the substrate solution, followed by addition of 50 μl of the enzyme solution. The mixture is centrifuged and the absorbance of the supernatant is measured in the same manner as above.

Activity

The amount of the enzyme which causes an increase of 0.2 in absorbance after 10 minutes' reaction under the above conditions (the value found by subtracting the absorbance value at 0 minute of reaction from the absorbance value after 10 minutes of reaction) is assumed to be one unit of activity.

The addition of the yoghurt-like food coagulant based on protease and a coagulant for tofu to soya milk in accordance with the present invention yields a yoghurt-like food with greater ease both process-wise and in terms of the rigor of process control than the method of production of a yoghurt-like food which depends on lactic acid fermentation of soya milk. The yoghurt-like food according to the present invention is comparable to the genuine yoghurt obtainable by lactic acid fermentation of cow's milk in texture and other eating qualities but it is an entirely new yoghurt-like food quite unlike the conventional products (the products of lactic acid fermentation of cow's milk or soya milk).

The following test examples illustrate the effects of the present invention.

Test Example 1

To 1 liter of soya milk (10% solids; temperature 20° C.) was added 20 g of glucono delta lactone together with the under-mentioned concentrations of bromelain (reagent grade, manufactured by Nakarai Chemicals, Ltd.) and the mixture was heated at 80° C. for 30 minutes. The palatability of the resulting foods was evaluated by a panel of tasters. In parallel, a control test was performed using 600 units of bromelain and without using glucono delta lactone. The results are set forth below in the Table 1.

TABLE 1

| Glucono delta lactone | 20 g | | | | | | | | | 0 |
|---|---|---|---|---|---|---|---|---|---|---|
| | Level of addition of bromelain (units) | | | | | | | | | |
| Bromelain | 0 | 50 | 100 | 200 | 400 | 600 | 800 | 1000 | 2000 | 600 |
| Evaluation | Too firm, poorly palatable | Slightly too firm but palatable | Slightly too firm but palatable | Slightly too firm but palatable | Somewhat firm but palatable | Smooth and palatable | Smooth and palatable | Smooth and palatable | Smooth and palatable | Texture too soft and weak, poorly palabable |

Test Example 2

The test was carried out by the same method as that of the test Example 1 except that calcium sulfate (CaSO$_4$·2H$_2$O) (3 g) was employed instead of glucono delta lactone.

The results are shown in the following Table 2.

TABLE 2

| CaSO$_4$.2H$_2$O | 3 g | | | | | | | | | 0 |
|---|---|---|---|---|---|---|---|---|---|---|
| | Level of addition of bromelain (units) | | | | | | | | | |
| Bromelain | 0 | 50 | 100 | 200 | 400 | 600 | 800 | 1000 | 2000 | 600 |
| Evaluation | Too firm, poorly palatable | Slightly too firm but palatable | Slightly too firm but palatable | Slightly too firm but palatable | Somewhat firm but palatable | Smooth and palatable | Smooth and palatable | Smooth and palatable | Smooth and palatable | Texture too soft and weak, poorly palabable |

Thus, the foods prepared without addition of protease and glucono delta lactone or calcium sulfate were either too soft or too firm in texture and poorly palatable. It is clear that the yoghurt-like food of the present invention can be obtained only when both protease and a coagulant for tofu are used together.

The following examples are further illustrative of the present invention.

EXAMPLE 1

| Glucono delta lactone | 100 Parts |
|---|---|
| Bromelain (20 units/mg) | 0.1 Part |

The above two ingredients are mixed to give a coagulant for yoghurt-like food.

EXAMPLE 2

| Glucono delta lactone | 100 Parts |
|---|---|
| Ficin (10 units/mg) | 0.2 Part |

The above ingredients are mixed to give a coagulant for yoghurt-like food.

EXAMPLE 3

| Glucono delta lactone | 100 Parts |
|---|---|
| Papain (40 units/mg) | 0.3 Part |

The above ingredients are mixed to give a coagulant for yoghurt-like food.

EXAMPLE 4

| Glucono delta lactone | 57 Parts |
|---|---|
| Bromelain (20 units/mg) | 0.1 Part |
| Sodium citrate | 43 Parts |

The above ingredients are mixed to give a coagulant for yoghurt-like food.

EXAMPLE 5

| Glucono delta lactone | 66 Parts |
|---|---|
| Bromelain (20 units/mg) | 0.1 Part |
| Sodium tartarate | 34 Parts |

The above ingredients are mixed to give a coagulant for yoghurt-like food.

EXAMPLE 6

| Glucono delta lactone | 66 Parts |
|---|---|
| Bromelain (20 units/mg) | 1 Part |
| Sodium tartarate | 34 Parts |

The above ingredients are mixed to give a coagulant for yoghurt-like food.

EXAMPLE 7

| Glucono delta lactone | 66 Parts |
|---|---|
| Bromelain (20 units/mg) | 0.1 Part |
| Sodium carbonate | 3 Parts |
| Sodium tartarate | 34 Parts |

The above ingredients are mixed to give a coagulant for yoghurt-like food.

EXAMPLE 8

| Glucono delta lactone | 66 Parts |
|---|---|
| Ficin (10 units/mg) | 0.2 Part |
| Sodium tartarate | 34 Parts |

The above ingredients are mixed to give a coagulant for yoghurt-like food.

EXAMPLE 9

| Glucono delta lactone | 57 Parts |
|---|---|
| Ficin (10 units/mg) | 0.2 Part |
| Sodium citrate | 43 Parts |

The above ingredients are mixed to give a coagulant for yoghurt-like food.

EXAMPLE 10

| Glucono delta lactone | 66 Parts |
|---|---|
| Ficin (10 units/mg) | 2 Parts |
| Sodium tartarate | 34 Parts |

The above ingredients are mixed to give a coagulant for yoghurt-like food.

EXAMPLE 11

| Glucono delta lactone | 66 Parts |
|---|---|
| Papain (40 units/mg) | 0.3 Part |
| Sodium tartarate | 34 Parts |

The above ingredients are mixed to give a coagulant for yoghurt-like food.

EXAMPLE 12

| Glucono delta lactone | 66 Parts |
|---|---|
| Papain (40 units/mg) | 0.3 Part |
| Sodium tartarate | 34 Parts |
| Trisodium phosphate | 5 Parts |

The above ingredients are mixed to give a coagulant for yoghurt-like food.

EXAMPLE 13

| Glucono delta lactone | 57 Parts |
|---|---|
| Papain (40 units/mg) | 0.3 Part |
| Sodium citrate | 43 Parts |

The above ingredients are mixed to give a coagulant for yoghurt-like food.

EXAMPLE 14

A soya milk prepared for the routine production of tofu (soybean curds) (temperature, 80° C. approx., about 10% solids) was cooled to about 20° C. To 6 liters of the above soya milk was added 150 g of glucono delta lactone together with 180 mg (3600 units) of bromelain (a protease manufactured by Nakarai Chemicals, Ltd.). The mixture was distributed into 300 ml packs and heated in a water bath at 80° C. for 30 minutes for coagulation. The above procedure gave about 6 kg of yoghurt-like food.

EXAMPLE 15

In 6 liters of a soya milk prepared in the same manner as Example 14 were dissolved 600 g of sucrose, 90 g of sodium citrate and 12 g of agar. To the resulting homogeneous solution were added 120 g of glucono delta lactone and 180 mg (3600 units) of bromelain (a protease manufactured by Nakarai Chemicals, Ltd.). The mixture was distributed into 300 ml packs and heated for 30 minutes in a water bath at 80° C. for coagulation. The above procedure yielded about 6.8 kg of yoghurt-like food.

EXAMPLE 16

In 6 liters of a soya milk prepared in the same manner as Example 14 were evenly dissolved 600 g of sucrose, 90 g of sodium citrate and 12 g of agar, followed by addition of 120 g of glucono delta lactone and 600 mg (24000 units) of papain (a protease of reagent grade, Merck & Co.). The mixture was distributed into 100 ml packs and heated in a water bath for 30 minutes at 80° C. for coagulation. The above procedure yielded about 6.8 kg of yoghurt-like food.

EXAMPLE 17

One-hundred grams of Hi-Proton ® (a soya powder manufactured by Japan Protein Industries Co., Ltd.) was thoroughly dispersed in 900 ml of water, heated (boiled for 3 minutes) and cooled. In the resulting soya milk were dissolved 100 g of sucrose, 10 g of sodium tartarate and 2 g of agar, followed by addition of 20 g of glucono delta lactone and 50 mg (500 units) of ficin (a protease of reagent grade manufactured by Tokyo Chemical Industries Co., Ltd.). The mixture was distributed into 100 ml packs and heated in a water bath at 80° C. for 30 minutes for coagulation. The above procedure yielded 1.1 kg of yoghurt-like food.

EXAMPLE 18

| | |
|---|---|
| Glucono delta lactone | 80 Parts |
| Bromelain (20 units/mg) | 0.2 Parts |
| Sodium tripolyphosphate | 18.7 Part |
| Sodium chloride | 1.3 Parts |

The above ingredients are mixed to give a coagulant for yoghurt-like food.

EXAMPLE 19

| | |
|---|---|
| Glucono delta lactone | 83 Parts |
| Bromelain (20 units/mg) | 1 Part |
| Sodium chloride | 17 Parts |

The above ingredients are mixed to give a coagulant for yoghurt-like food.

EXAMPLE 20

In 10 liters of soya milk prepared in the same manner as Example 14 were dissolved 1.5 kg of fructose, 150 g of cocoa powder and 50 g of the coagulant prepared in Example 19. The resulting solution was distributed into 100 ml packs and heated for 30 minutes in a water bath at 70° C. for coagulation to give 12.5 kg of yoghurt-like food with chocolate flavor.

EXAMPLE 21

In 10 liters of soya milk prepared in the same manner as Example 14 were 1.3 kg of fructose, 5 g of banana flavor and 275 g of the coagulant prepared in Example 18. The resulting solution was distributed into 100 ml packs and heated for 30 minutes in a water bath at 80° C. for coagulation to give 11.5 kg of yoghurt-like food with banana flavor.

EXAMPLE 22

In 10 liters of soya milk prepared in the same manner as Example 14 were dissolved 1.3 kg of fructose, 100 g of spinach powder and 50 g of the coagulant prepared in Example 19. The resulting solution was distributed into 100 ml packs and heated for 30 minutes in a water bath at 70° C. for coagulation to give 11 kg of yoghurt-like food with spinach flavor.

EXAMPLE 23

In 10 liters of soya milk prepared in the same manner as Example 14 were dissolved 1.3 kg of fructose, 100 g of strawberry juice powder and 275 g of the coagulant prepared in Example 18. The resulting solution was distributed into 100 ml packs and heated for 30 minutes in a water bath at 80° C. for coagulation to give 11.5 kg of yoghurt-like food with strawberry flavor.

EXAMPLE 24

In 10 liters of soya milk prepared in the same manner as Example 14 were dissolved 1 kg of fructose, 120 g of powdered green tea and 50 g of the coagulant prepared in Example 19. The resulting solution was distributed into 100 ml packs and heated for 30 minutes in a water bath at 80° C. for coagulation to give 11.2 kg of yoghurt-like food with powdered green tea flavor.

EXAMPLE 25

In 10 liters of soya milk prepared in the same manner as Example 14 were 1 kg of fructose, 200 g of pumpkin powder and 50 g of the coagulant prepared in Example 19. The solution was distributed into 100 ml packs and heated for 30 minutes in a water bath at 80° C. for coagulation to give 11.2 kg of yoghurt-like food with pumpkin flavor.

EXAMPLE 26

In 1 liter of soya milk prepared in the same manner as Example 14 were added 3 g of calcium sulfate ($CaSO_4 \cdot 2H_2O$) and 50 mg of bromelain (1000 units). The resulting mixture was distributed into 100 ml packs and heated for 30 minutes in a water bath at 80° C. for coagulation to give 1 kg of yoghurt-like food.

EXAMPLE 27

In 10 liters of soya milk prepared in the same manner as Example 14 were added 1 kg of sucrose, 30 g of calcium sulfate ($CaSO_4 \cdot 2H_2O$) and 500 mg of bromelain (10000 units). The resulting mixture was distributed into 100 ml packs and heated for 30 minutes in a water bath at 80° C. for coagulation to give 11 kg of yoghurt-like food.

EXAMPLE b 28

In 10 liters of soya milk prepared in the same manner as Example 14 were added 1 kg of sucrose, 30 g of calcium sulfate ($CaSO_4 \cdot 2H_2O$) and 1 g of papain (40000 units). The resulting mixture was distributed into 100 ml packs and heated for 30 minutes in a water bath at 80° C. for coagulation to give 11 kg of yoghurt-like food.

EXAMPLE 29

In 10 liters of soya milk prepared in the same manner as Example 14 were added 1 kg of sucrose, 30 g of calcium sulfate (CaSO$_4$·2H$_2$O) and 600 mg of ficin (6000 units). The resulting mixture was distributed into 100 ml packs and heated for 30 minutes in a water bath at 80° C. for coagulation to give 11 kg of yoghurt-like food.

EXAMPLE 30

One kilograms of Hi-Proton ® (a soya powder manufactured by Japan Protein Industries Co., Ltd) was thoroughly dispersed in 9 liters of water, heated (boiled for 3 minutes) and cooled to about 20° C. In the resulting soya milk were dissolved 1 kg of sucrose, followed by addition of 30 g of calcium sulfate (CaSO$_4$·2H$_2$O) and 500 mg of bromelain (10,000 units). The mixture was distributed into 100 ml packs and heated for 30 minutes in a water bath at 80° C. to give 11 kg of yoghurt-like food.

EXAMPLE 31

| | |
|---|---|
| Calcium sulfate (CaSO$_4$·2H$_2$O) | 85 Parts |
| Bromelain (20 units/mg) | 1 Part |
| Sodium chloride | 14 Parts |

The above ingredients are mixed to give a coagulant for yoghurt-like food.

EXAMPLE 32

| | |
|---|---|
| Magnesium sulfate (MgSO$_4$·3H$_2$O) | 85 Parts |
| Bromelain (20 units/mg) | 1 Part |
| Sodium chloride | 14 Parts |

The above ingredients are mixed to give a coagulant for yoghurt-like food.

EXAMPLE 33

In 10 liters of soya milk prepared in the same manner as Example 14 were added 1.5 kg of high fructose corn sirup and 5 g of plain yoghurt-like flavor with stirring, and then 275 g of the coagulant prepared in Example 18 was added to the mixture. The resulting mixture was distributed into 100 ml packs and heated for 30 minutes in a water bath at 80° C. for coagulation to give 11.5 kg of yoghurt-like food with plain yoghurt-like flavor.

We claim:

1. A coagulant for preparation of an unfermented yoghurt-like food consisting essentially of an admixture of protease and a coagulant for tofu selected from the group consisting of glucono delta lactone, calcium sulfate, calcium chloride, calcium gluconate, calcium lactate, magnesium sulfate, magnesium chloride, calcium pantothenate and calcium glycerophosphate.

2. A coagulant for preparation of an unfermented yoghurt-like food consisting essentially of an admixture of protease, a coagulant for tofu selected from the group consisting of glucono delta lactone, calcium sulfate, calcium chloride, calcium gluconate, calcium lactate, magnesium sulfate, magnesium chloride, calcium pantothenate and calcium glycerophosphate and one or more agents selected from taste-ameliorating agents, flavors and colors.

3. A coagulant according to claims 1 or 2, wherein the coagulant for tofu is glucono delta lactone.

4. A coagulant according to claim 3, wherein the relative amount of glucono delta lactone and protease is 0.01 to 50 weight parts of the protease (20 units/mg) to each 100 weight parts of glucono delta lactone.

5. A coagulant according to claim 1 and 2, wherein the coagulant for tofu is glucono delta lactone and the protease is bromelain, papain or ficin.

6. A coagulant according to claims 1 or 2, wherein the coagulant for tofu is calcium sulfate or magnesium sulfate and the protease is bromelain, papain or ficin.

* * * * *